(12) United States Patent
Heim (10) Patent No.: US 11,083,258 B2
(45) Date of Patent: Aug. 10, 2021

(54) CLAMPING DEVICE FOR A LONGITUDINALLY ADJUSTABLE POLE

(71) Applicant: LEKISPORT AG, Baar (CH)

(72) Inventor: Eberhard Heim, Unterensingen (DE)

(73) Assignee: LEKISPORT AG, Baar (CH)

( * ) Notice: Subject to any disclaimer, the term of this patent is extended or adjusted under 35 U.S.C. 154(b) by 0 days.

(21) Appl. No.: 16/616,709

(22) PCT Filed: Jun. 4, 2018

(86) PCT No.: PCT/EP2018/064559
§ 371 (c)(1),
(2) Date: Nov. 25, 2019

(87) PCT Pub. No.: WO2018/224417
PCT Pub. Date: Dec. 13, 2018

(65) Prior Publication Data
US 2020/0405021 A1      Dec. 31, 2020

(30) Foreign Application Priority Data

Jun. 6, 2017   (CH) .................................... 00720/17

(51) Int. Cl.
*A45B 9/00*        (2006.01)
*F16B 7/10*        (2006.01)

(52) U.S. Cl.
CPC ................ *A45B 9/00* (2013.01); *F16B 7/105* (2013.01); *A45B 2009/005* (2013.01)

(58) Field of Classification Search
CPC ...... F16B 7/105; A45B 9/00; A45B 2009/007
See application file for complete search history.

(56) References Cited

U.S. PATENT DOCUMENTS 6,347,777 B1 *   2/2002  Webber .................. A47C 7/402
                                                      248/188.5
6,832,784 B1 *  12/2004  Chen ...................... A47L 9/244
                                                        285/303
(Continued)

FOREIGN PATENT DOCUMENTS

DE      694 01 765 T2    10/1997
DE      297 06 849 U1     8/1998
(Continued)

OTHER PUBLICATIONS

International Search Report for PCT/EP2018/064559, dated Jul. 30, 2018.

*Primary Examiner* — Noah Chandler Hawk
(74) *Attorney, Agent, or Firm* — Sughrue Mion, PLLC (57) ABSTRACT

A clamping device (1) for a walking pole for securing an inner tube (3) which can be slid into an opening of the clamping device that is secured to an outer tube (2). There is a plastic sleeve (4), on which a clamping lever (6) is hinged against the force of a spring element (10). The clamping lever (6) has a first lever arm (12) for releasing the clamping device (1) and a second lever arm (11) arranged on the other side. The second lever arm (11) has a protrusion (9) which is arranged radially to the pole axis (36) and which engages into and through a radial through-opening (19) in the plastic sleeve (4) and engages into a groove (22) of the inner tube (3) in a formfitting manner in order to axially secure the two tubes (2, 3).

27 Claims, 3 Drawing Sheets

(56) References Cited

U.S. PATENT DOCUMENTS

| | | | | |
|---|---|---|---|---|
| 7,040,832 B2* | 5/2006 | Hsieh | ............ | F16B 7/105 |
| | | | | 248/125.8 |
| 8,006,711 B2* | 8/2011 | Pietrzak | ............ | A63C 11/221 |
| | | | | 135/75 |
| 8,376,646 B2* | 2/2013 | Melino, Sr. | ............ | F16B 7/1454 |
| | | | | 403/109.3 |
| 8,485,488 B2* | 7/2013 | Forrest | ............ | A47B 91/02 |
| | | | | 248/408 |

FOREIGN PATENT DOCUMENTS

| | | |
|---|---|---|
| DE | 297 08 829 U1 | 10/1998 |
| DE | 20 2004 002 426 U1 | 7/2004 |
| EP | 0 098 898 A1 | 1/1984 |
| EP | 1 217 224 A1 | 6/2002 |
| EP | 1 450 906 A1 | 9/2004 |
| FR | 2 526 281 A1 | 11/1983 |
| WO | 2010/085905 A1 | 8/2010 |
| WO | 2013/020861 A1 | 2/2013 |

\* cited by examiner

CLAMPING DEVICE FOR A LONGITUDINALLY ADJUSTABLE POLE

CROSS REFERENCE TO RELATED APPLICATIONS

This application is a National Stage of International Application No. PCT/EP2018/064559 filed Jun. 4, 2018, claiming priority based on Switzerland Patent Application No. 00720/17 filed Jun. 6, 2017.

TECHNICAL FIELD

The present invention relates to the field of poles for walking, Nordic walking, but also in the widest sense to other types of sport such as cross-country skiing or Alpine skiing, alpinism, etc.

PRIOR ART

Pole constructions which have an adjustable length are known in particular, but not exclusively, from the field of walking or Nordic walking. The adjustability can on one hand be used so that the length of the pole can be set in a manner adjusted to requirements and on the other, however, also to reduce the pole to a pack mass which is as small as possible, i.e. configure the length to be capable of being reduced to such an extent that the pole can be stored, for example, in a rucksack or the like. Such constructions, in the case of which what are known as inner tubes with a small diameter are mounted displaceably in an outer tube with a slightly larger diameter, and in the case of which the relative position of the tube portions can be fixed by a fixing mechanism, are known, for example, from DE 297 06 849 or, however, also from DE 297 08 829 or EP 1 450 906.

Alternative mechanisms in the case of which the relative fixing of the axial position of different tube portions is not realized by an internal fixing mechanism are known, for example, from WO 2010/085905 or, however, also from DE 694 01 765 or EP 1 217 224 or EP 098 898, these external constructions are, however, often not suitable for mounting more than two pole tubes displaceably into one another, as a result of which a sufficiently small pack mass is then also not produced.

There is known from an entirely different field, namely from the field of umbrella stands, from DE202004002426 a clamping mechanism in the case of which a two-part clamping lever with a joint is fastened to a sleeve and in the case of which the front arm of the clamping lever is formed in the form of a pin which is mounted so that it can move only perpendicular to the stand axis and can engage in a hole in an inner tube.

DESCRIPTION OF THE INVENTION

The object is correspondingly to provide an improved clamping device for a walking pole, trekking pole, Nordic walking pole, cross-country skiing pole or ski pole for positive-locking, detachable axial fixing of an inner tube portion which can be pushed into an opening of the clamping device fastened to an outer tube, in particular for folding poles which are tensioned with an elastic load cable.

The proposed clamping device has a circumferential plastic sleeve on which a clamping lever is articulated tiltably against the restoring force of a spring element on the outside via an axis, which is arranged perpendicular to the pole axis.

The clamping lever can be composed of metal or a plastic, where applicable, in fiber-reinforced form, or of a combination of these materials.

The plastic sleeve further has two projections with through-openings and/or recesses for the axis, and the clamping lever is mounted between these projections tiltably about the axis.

The plastic sleeve further has a radial passage opening or through opening, provided so that the clamping lever can pass with one lever arm end through this passage opening.

The clamping lever has a first lever arm with a pressure region, which is accessible from the outside, for releasing the clamping device and a second lever arm, which is arranged on the other side of the axis. The second lever arm has a clamping projection arranged substantially radially with respect to the pole axis. This clamping projection engages through the radial passage opening in the plastic sleeve into an axial passage opening of the plastic sleeve and engages in a positive-locking manner into a groove or recess of the inner tube or of a guide insert connected to the inner tube for the axial fixing of the two tubes.

This small mechanism is preferably formed to be self-latching.

The clamping lever can be formed to be strip-shaped, e.g. with a width along the axis of at least 2 mm, preferably at least 4 mm, in particular preferably in the range of 4-12 mm. The second lever arm can furthermore have a strip-shaped clamping projection arranged substantially radially with respect to the pole axis, which clamping projection engages through the radial longitudinal passage opening in the plastic sleeve into an axial passage opening of the plastic sleeve and engages in a positive-locking manner in a partially circumferential groove of the inner tube or a guide insert connected to the inner tube for the axial fixing of the two tubes.

There can be several grooves or recesses of the inner tube or a guide insert connected to the inner tube in order to set the length differently.

There are preferably 1, 2, 3 or 4 grooves or recesses of the inner tube or a guide insert connected to the inner tube.

A first preferred embodiment is characterized in that the clamping device further has a circumferential metal band (on the side opposite the clamping lever) which is arranged in each case on the outside of the two projections, in each case with a passage opening for the axis through which the axis also passes, and which is arranged running around the circumference, which faces away from the projections, of the clamping sleeve.

The metal band can be arranged in a depression, preferably in a circumferential depression of the plastic sleeve.

The metal band preferably has a width, parallel to the pole axis, at least in the circumferential region in the range of 4-15 mm, preferably in the range of 5-10 mm.

The metal band is preferably composed of stainless steel or another stainless metal alloy.

The metal band and/or the clamping lever is preferably a component produced preferably in a punching and reshaping process or a pressure die casting process. The clamping lever can, if it is made of plastic, also be produced just like the sleeve in an injection molding process.

The plastic sleeve itself is preferably composed of a thermoplastic plastic, for example, polyethylene, polypropylene, PET, polyurethane, polyamide, polycarbonate, or a mixture of these materials, wherein the materials can be reinforced, in particular with glass fibers. The plastic sleeve is typically produced in an injection molding process.

The clamping lever preferably has, as seen in the direction of the axis, a substantially L-shaped profile, the lower horizontal limb of which forms with its exposed end the clamping projection, and the upper vertical limb of which provides the pressure region. Regions placed on the two edge regions facing the projections toward the tube are preferably provided, which regions have in each case a passage opening for the axis and which run substantially parallel to the main running direction of the projections.

The clamping projection preferably has a curved region, preferably with a substantially circular arc-shaped contour, in particular preferably adapted to the diameter of the groove which itself is preferably formed to be at least circumferential and circular arc-shaped.

The clamping projection preferably has a width, perpendicular to the pole axis, in the range of 2-10 mm, preferably in the range of 3-7 mm.

The clamping lever preferably has a width, perpendicular to the pole axis, in the range of 4-15 mm, preferably in the range of 8-12 mm.

The restoring force of the clamping lever is preferably provided via a spring element in the form of a spiral spring with two limbs, wherein the axis preferably passes through the opening of the spiral region of the spring element, and a first limb rests on an outer surface of the plastic sleeve and a second limb rests on the inner surface of the clamping lever, preferably on the inner surface of the clamping lever opposite the pressure region.

A guide insert fastened to the inner tube can be provided, which guide insert engages with a first region into an inner space of the inner tube and is fastened therein, and which projects with a second region beyond the end of the inner tube and engages in the inner space of the outer tube, wherein the outer diameter of the second region is preferably substantially equal to or only insignificantly smaller than the inner diameter of the inner space of the outer tube, and wherein at least one preferably circumferential groove is provided for the clamping projection in the third or quarter of the second region facing the inner tube.

The first lever arm with the pressure region which is accessible from the outside for release of the clamping device and the second lever arm of the clamping lever arranged on the other side of the axis are normally formed in one piece and preferably rigidly.

The clamping lever can be injection molded as a whole in one piece from a plastic material, preferably with fiber reinforcement, or be composed of metal and punched and reshaped from a sheet metal portion or formed as a pressure die casting. The present invention further relates to a walking pole, trekking pole, Nordic walking pole, cross-country skiing pole or ski pole with a clamping device as described above and defined in the claims.

The pole preferably has at least one outer tube with a clamping device fastened thereon and at least one inner tube as well as preferably additionally a handle preferably fastened to the outer tube and preferably a pole tip on the inner tube or on a further tube portion connected directly or indirectly thereto with the same diameter as or a smaller diameter than the inner tube.

Such a tube can be characterized in that it involves a folding pole with at least three, preferably at least four tube portions, wherein the individual portions are connected to one another via an elastic tension element.

The tube portions in the assembled state of the folding pole are preferably connected to one another via plug connections oriented along the pole axis, and at least two tube portions in the folded together state are only connected to one another via a movable connection element, and wherein a pole handle is arranged on an uppermost tube portion and a pole tip is arranged on a lowermost tube portion. One of the plug connections is realized via the clamping mechanism, wherein the clamping mechanism is fastened to a first tube portion, and in the case of which a second tube portion, which has a smaller or approximately identical outer diameter than/as the inner diameter of the first tube portion and which is displaceably mounted in the first tube portion itself, can be fixed in the relative axial position by the external clamping mechanism.

The further plug connections can be formed as pure plug connections, in the case of which tube portions in the pushed together state are only fixed in one axial direction.

The tube portions can be connected to one another via at least one load cable, which is preferably elastic at least in regions, which is fastened, for example, to the lowermost tube portion and is fastened to the uppermost tube portion and is arranged running through the inner space of the at least two central tube portions.

The folding pole can be formed in such a manner that it can be transferred from the folded together state into the assembled state in that the further plug connections are plugged together and in that subsequently in the case of a detached clamping mechanism the second tube portion can be pulled out of the first tube portion so far until the load cable is under tension and in that the external clamping mechanism is fixed, preferably in a self-latching manner.

Further embodiments are indicated in the dependent claims.

BRIEF DESCRIPTION OF THE DRAWINGS

Preferred embodiments of the invention are described below on the basis of the drawings which only serve the purpose of explanation and are not to be interpreted in a restrictive manner. In the drawings:

FIGS. 1a)-1c) shows a clamping device with pole tubes in various views, namely in FIG. 1a) a perspective view, in FIG. 1b) a view of the pivoting lever region and in FIG. 1c) a section along line A-A in FIG. 1b);

FIGS. 5a)-5e) shows the clamping device without pole tubes in various views, namely in FIG. 5a) in a view from above, i.e. from the side of the tube with a larger cross-section; in FIG. 5b) in a view from below, i.e. from the side of the tube with a smaller cross-section; in FIG. 5c) in a side view; in FIG. 5d) in a perspective representation with a view into the passage opening from above; and in d) FIG. 5e) in a perspective representation with a view into the passage opening from below.

DESCRIPTION OF PREFERRED EMBODIMENTS

Figure 1:
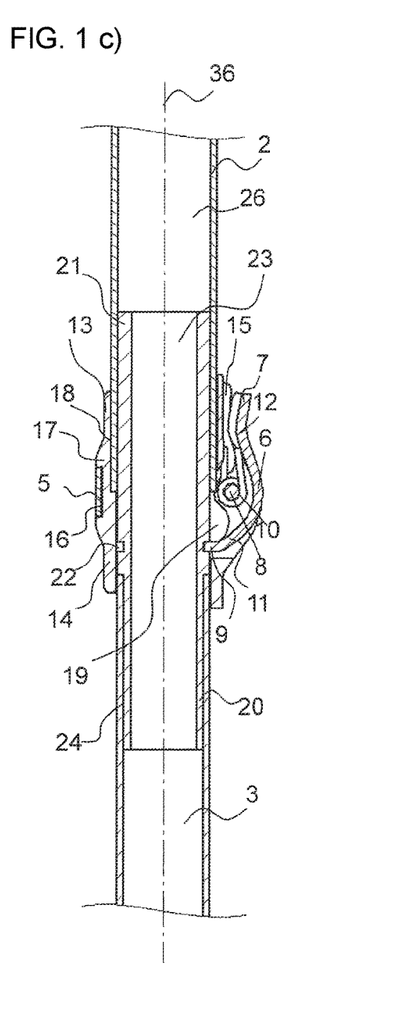

FIGS. 1a)-1c) show clamping device with pole tubes 2 and 3 directly adjoining it. A perspective view is represented in FIG. 1a). Clamping device 1 has a circumferential plastic sleeve 4, typically produced from a thermoplastic plastic material in an injection molding process. A metal band 5 is arranged circumferentially around the plastic sleeve in the central region. Two projections 29 and 30 are formed on the plastic sleeve between the free ends of the metal band, through which in each case an axis 8 passes, which projections protrude in the radial direction and form therebetween space for a clamping lever 6, typically composed of metal. Clamping lever 6 has, in the upper region, i.e. in the region which faces the outer tube with a larger diameter 2, a pressure region 7 and engages with the lower region in a positive-locking manner into inner pole tube 3 or an element arranged thereon in order to fix the relative axial position of both tubes 2, 3.

FIG. 1*b*) represents how the plastic sleeve has an upper region 13, a central region 17, in which metal band 5 is arranged, and a lower region 14 which faces inner tube 3. Upper region 13 forms to a certain extent a receiving opening for the free end of outer tube 2 and lower region 14 serves as a receiving opening for inner tube 3. Outer tube 2 is fastened to the plastic sleeve. This is apparent from the sectional representation in FIG. 1*c*). The free end of the outer tube engages in a region 18 with an expanded diameter of plastic sleeve 4 and is fastened therein in a positive locking and/or frictional and/or firmly bonded manner. There is, on the outside, a circumferential depression 16, in which metal band 5 is arranged in the circumferential region, in a central region 17, configured with a slightly extended outer diameter, of the sleeve.

Clamping lever 6 is substantially L-shaped, wherein the upper vertical region can be actuated right at the top from the outside via a pressure region 7. This region can also be configured to be slightly concave from the outside. The lever has an upper lever arm 12 and a lower lever arm 11, while axis 8 lies therebetween.

Lower lever arm 11 forms at its radially inner free end a clamping projection 9 which engages in a positive-locking and self-latching manner in a circumferential groove 22 of a guide insert 20 which is fastened to inner tube 3.

Lever 6 is tensioned with a spiral spring against the sleeve so that it remains in the latched-in position, as represented in FIG. 1*c*. Spiral spring 10 engages with its spiral region around axial pin 8 (usually composed of metal) and one of the limbs of the spring lies on the inner side of upper lever arm 12 and the other limb, represented on the left in the figure, lies on the outer surface of upper sleeve region 13, to a certain extent behind lever 6.

A gap 15 thus remains between the outer wall of upper region 13 and region 7 of lever 6. If, for example, one presses with the finger on region 7, the lever pivots in the situation represented in the figure by a few degrees in an anti-clockwise direction, wherein clamping projection 9 is pulled out of groove 22 in the radial direction and the previously fixed axial position between both tubes 3 is released. Lower lever arm 11 engages through a passage opening 19 in the central or lower region of the clamping sleeve in order to be able to provide this positive locking.

Figure 2:
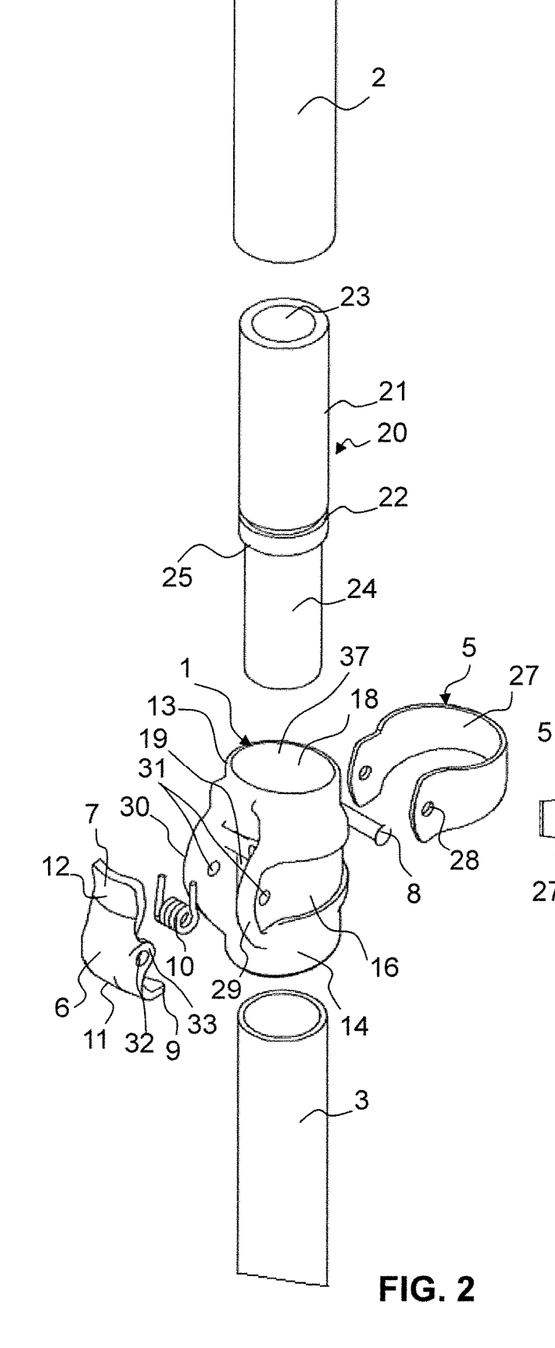
FIG. 2 shows the clamping device in a perspective exploded representation.

The same clamping device is indicated in an exploded representation in FIG. 2. Here, the individual elements are apparent in their form and structure. In particular, it can be recognized in the case of lever 6 how it has in a central region in each case two reversed regions 33 facing the tube, in which regions 33 passage openings 32 are present for axis 8. The representation also shows passage openings 31 for the axis in both projections 29 and 30 as well as the passage opening present to a certain extent between these projections and below the axis for lower lever arm 11 and the positive-locking engagement in groove 22.

Figure 3:
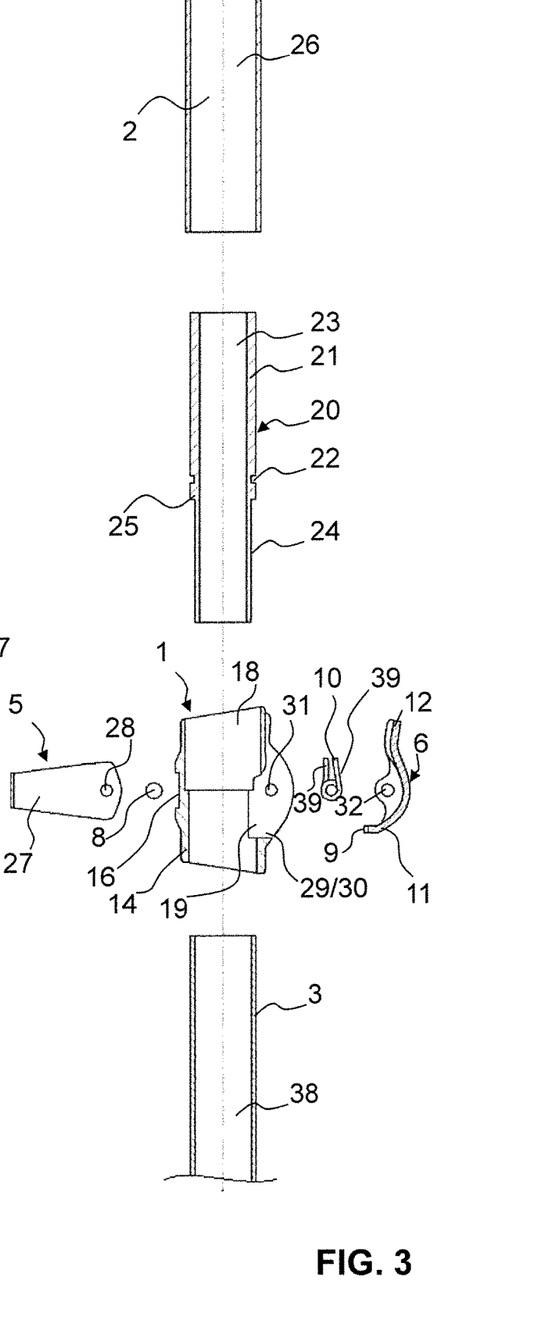
FIG. 3 shows the clamping device in an exploded representation in section.

Elements according to FIG. 2 are reproduced in a sectional representation in FIG. 3, wherein it can be particularly easily recognized how restoring spring 10 has two limbs 39 which have to be pushed against one another during release of the clamping mechanism, and correspondingly provide a restoring force in the clockwise direction.

As a result of this spring action, the clamping mechanism is self-latching.

Figure 4:
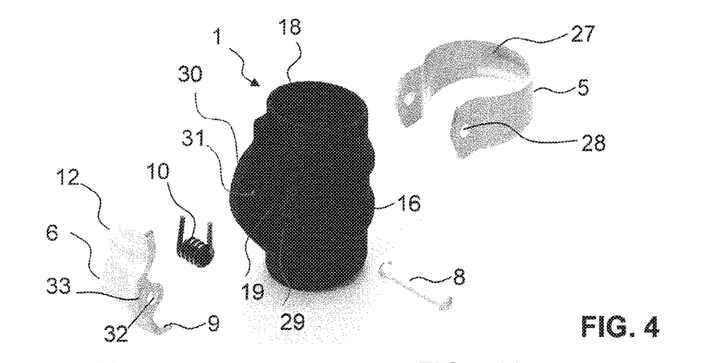
FIG. 4 shows a perspective exploded representation.

FIG. 4 depicts a similar exploded representation in perspective and without tube portions or guide insert, wherein it can above all be recognized here how inner surface 27 of metal band 5 engages in circumferential depression 16 and comes to bear with the thermoplastic component of the plastic sleeve. The metal band structure lies to a certain extent across its entire length in a depression so that the metal band does not protrude beyond the surface of the plastic part.

Figure 5:
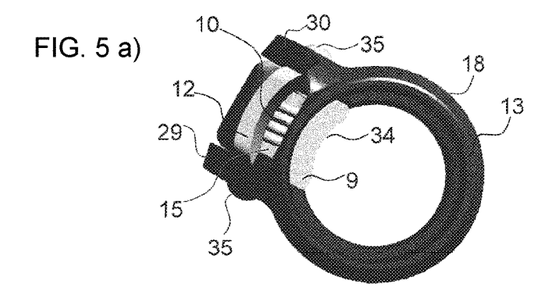

Finally, the clamping sleeve in FIGS. 5*a*)-5*e*) are reproduced in various representations, in FIG. 5*a*) in a view from above, in FIG. 5*b*) in a view from below, in FIG. 5*c*) in a side view, in FIG. 5*d*) in a perspective view from above into the passage opening; and in FIG. 5*e*) in a perspective view also into the passage opening, but from below.

It can in particular be recognized on the basis of these representations how the radially inwardly facing edge region of clamping projection 9 is preferably formed as a curved region 34. Since the groove, as is apparent, for example, from FIG. 3, is formed as a circumferential groove 22 in guide insert 20, it is thus ensured that the front edge of clamping projection 9 lies in this groove across as large as possible a circumferential region and the bearing forces can be correspondingly distributed over as large a region as possible.

LIST OF REFERENCE NUMBERS

1 Clamping device
2 Pole tube with larger diameter, outer tube
3 Pole tube with smaller diameter, inner tube
4 Circumferential plastic sleeve of 1
5 Circumferential metal band
6 Clamping lever
7 Pressure region of 6
8 Axis of 6
9 Clamping projection of 6
10 Restoring spring of 6
11 Lower lever arm of 6
12 Upper lever arm of 6
13 Upper region of 4
14 Lower region of 4
15 Gap between 11 and 13
16 Circumferential depression in 17 for 5
17 Central region of 4
18 Region with expanded diameter for 2 in 4
19 Radial passage opening for 9/11 in 4
20 Guide insert in 3
21 Region protruding beyond 3 of 20
22 Clamping groove in 21
23 Axial passage opening in 20
24 Region with reduced diameter for 3 in 20, plug region in 3
25 Shoulder for 3
26 Inner space of 2
27 Inner surface of 5
28 Passage opening for 8 in 5
29 First projection
30 Second projection
31 Passage opening in 29/30 for 8
32 Passage opening in 6 for 8
33 Reversed region for 32 of 6
34 Curved region of 9
35 Connecting head of 8
36 Pole axis 37 Axial passage opening in 1 for pole tubes
38 Inner space of 3
39 Limb of 10

The invention claimed is:
1. A clamping device for a walking pole, trekking pole, Nordic walking pole, cross-country skiing pole or ski pole for positive-locking, detachable axial fixing of an inner tube portion which can be pushed into an opening of the clamping device fastened to an outer tube,
   wherein the clamping device has a circumferential plastic sleeve on which a clamping lever is articulated tiltably against the restoring force of a spring element on the outside via an axis that is arranged perpendicular to a pole axis,
   wherein the plastic sleeve has two projections with through-openings and/or recesses for the axis, and the clamping lever is mounted between these projections tiltably about the axis, and wherein the plastic sleeve has a radial passage opening,
   wherein the clamping lever has a first lever arm with a pressure region, which is accessible from the outside, for releasing the clamping device and a second lever arm which is arranged on the other side of the axis, wherein the second lever arm has a clamping projection arranged substantially radially with respect to the pole axis, which clamping projection engages through the radial passage opening in the plastic sleeve into an axial passage opening of the plastic sleeve and engages in a positive-locking manner into a groove or a recess of the inner tube or of a guide insert connected to the inner tube for the axial fixing of the two tubes, and
   wherein the clamping device further comprises a circumferential metal band which is arranged in each case on an outer side of the two projections, in each case with a passage opening for the axis, and which is arranged running around the circumference, which faces away from the projections, of the clamping sleeve.
2. The clamping device as claimed in claim 1, wherein the metal band is arranged in a depression of the plastic sleeve.
3. The clamping device as claimed in claim 1, wherein the metal band has a width, parallel to the pole axis, at least in a circumferential region in the range of 4-15 mm, and/or the metal band is composed of stainless steel.
4. The clamping device as claimed in claim 1, wherein the second lever arm has a strip-shaped clamping projection arranged substantially radially with respect to the pole axis, which clamping projection engages through the radial longitudinal passage opening in the plastic sleeve into an axial passage opening of the plastic sleeve and engages in a positive-locking manner in a partially circumferential groove of the inner tube or of a guide insert connected to the inner tube for the axial fixing of the two tubes.
5. The clamping device as claimed in claim 1, wherein the clamping projection has a curved region.
6. The clamping device as claimed in claim 1, wherein the clamping projection has a width, perpendicular to the pole axis, in the range of 2-10 mm.
7. The clamping device as claimed in claim 1, wherein the clamping lever has a width, perpendicular to the pole axis, in the range of 4-15 mm.
8. The clamping device as claimed in claim 1, wherein the restoring force of the clamping lever is provided via a spring element in the form of a spiral spring with two limbs.
9. The clamping device as claimed in claim 1, wherein the first lever arm with the pressure region which is accessible from the outside for release of the clamping device and the second lever arm of the clamping lever arranged on the other side of the axis are formed in one piece.
10. The clamping device as claimed in claim 1, wherein the metal band is arranged in a circumferential depression of the plastic sleeve.
11. The clamping device as claimed in claim 1, wherein the metal band has a width, parallel to the pole axis, at least in the circumferential region in the range of 5-10 mm.
12. The clamping device as claimed in claim 1, wherein the clamping projection has a curved region, with a substantially circular arc-shaped contour, adapted to the diameter of the groove.
13. The clamping device as claimed in claim 1, wherein the clamping projection has a width, perpendicular to the pole axis, in the range of 3-7 mm.
14. The clamping device as claimed in claim 1, wherein the clamping lever has a width, perpendicular to the pole axis, in the range of 8-12 mm.
15. The clamping device as claimed in claim 1, wherein the restoring force of the clamping lever is provided via a spring element in the form of a spiral spring with two limbs, wherein the axis passes through the opening of the spiral region of the spring element, and a first limb rests on an outer surface of the plastic sleeve and a second limb rests on the inner surface of the clamping lever, on the inner surface of the clamping lever opposite the pressure region.
16. The clamping device as claimed in claim 1, wherein a guide insert fastened to the inner tube is provided, which guide insert engages with a first region into an inner space of the inner tube and is fastened therein, and which projects with a second region beyond the end of the inner tube and engages in the inner space of the outer tube, wherein the outer diameter of the second region is substantially equal to or only insignificantly smaller than the inner diameter of the inner space of the outer tube, and wherein at least one circumferential groove is provided for the clamping projection in the third or quarter of the second region facing the inner tube.
17. The clamping device as claimed in claim 1, wherein the first lever arm with the pressure region which is accessible from the outside for release of the clamping device and the second lever arm of the clamping lever arranged on the other side of the axis are formed in one piece and rigidly.
18. The clamping device as claimed in claim 1, wherein the clamping lever is formed to be strip-shaped with a width along the axis of in the range of 4-12 mm.
19. The clamping device as claimed in claim 1, wherein the clamping lever is formed to be strip-shaped with a width along the axis of at least 2 mm.
20. A clamping device for a walking pole, trekking pole, Nordic walking pole, cross-country skiing pole or ski pole for positive-locking, detachable axial fixing of an inner tube portion which can be pushed into an opening of the clamping device fastened to an outer tube,
   wherein the clamping device has a circumferential plastic sleeve on which a clamping lever is articulated tiltably against the restoring force of a spring element on the outside via an axis that is arranged perpendicular to a pole axis,
   wherein the plastic sleeve has two projections with through-openings and/or recesses for the axis, and the clamping lever is mounted between these projections tiltably about the axis, and wherein the plastic sleeve has a radial passage opening,
   wherein the clamping lever has a first lever arm with a pressure region, which is accessible from the outside, for releasing the clamping device and a second lever arm which is arranged on the other side of the axis, wherein the second lever arm has a clamping projection arranged substantially radially with respect to the pole axis, which clamping projection engages through the radial passage opening in the plastic sleeve into an axial passage opening of the plastic sleeve and engages in a positive-locking manner into a groove or a recess of the inner tube or of a guide insert connected to the inner tube for the axial fixing of the two tubes, wherein the clamping lever has, as seen in the direction of the axis, a substantially L-shaped profile, the lower horizontal limb of which forms with its exposed end the clamping projection, and the upper vertical limb of which provides the pressure region, and wherein the lower horizontal limb and the upper vertical limb are formed in one rigid piece.

21. A clamping device for a walking pole, trekking pole, Nordic walking pole, cross-country skiing pole or ski pole for positive-locking, detachable axial fixing of an inner tube portion which can be pushed into an opening of the clamping device fastened to an outer tube, wherein the clamping device has a circumferential plastic sleeve on which a clamping lever is articulated tiltably against the restoring force of a spring element on the outside via an axis that is arranged perpendicular to a pole axis, wherein the plastic sleeve has two projections with through-openings and/or recesses for the axis, and the clamping lever is mounted between these projections tiltably about the axis, and wherein the plastic sleeve has a radial passage opening, wherein the clamping lever has a first lever arm with a pressure region, which is accessible from the outside, for releasing the clamping device and a second lever arm which is arranged on the other side of the axis, wherein the second lever arm has a clamping projection arranged substantially radially with respect to the pole axis, which clamping projection engages through the radial passage opening in the plastic sleeve into an axial passage opening of the plastic sleeve and engages in a positive-locking manner into a groove or a recess of the inner tube or of a guide insert connected to the inner tube for the axial fixing of the two tubes, and wherein a guide insert fastened to the inner tube is provided, which guide insert engages with a first region into an inner space of the inner tube and is fastened therein, and which projects with a second region beyond the end of the inner tube and engages in the inner space of the outer tube.

22. The clamping device as claimed in claim 21, wherein the clamping lever is injection molded as a whole in one piece from a plastic material, or consists of a metal and is punched and formed from a sheet metal portion or is formed as a pressure die casting.

23. The clamping device as claimed in claim 21, wherein the clamping lever is injection molded as a whole in one piece from a plastic material, with fiber reinforcement.

24. A walking pole, trekking pole, Nordic walking pole, cross-country skiing pole or ski pole with a clamping device for positive-locking, detachable axial fixing of an inner tube portion which can be pushed into an opening of the clamping device fastened to an outer tube, wherein the clamping device has a circumferential plastic sleeve on which a clamping lever is articulated tiltably against the restoring force of a spring element on the outside via an axis that is arranged perpendicular to a pole axis, wherein the plastic sleeve has two projections with through-openings and/or recesses for the axis, and the clamping lever is mounted between these projections tiltably about the axis, and wherein the plastic sleeve has a radial passage opening, wherein the clamping lever has a first lever arm with a pressure region, which is accessible from the outside, for releasing the clamping device and a second lever arm which is arranged on the other side of the axis, wherein the second lever arm has a clamping projection arranged substantially radially with respect to the pole axis, which clamping projection engages through the radial passage opening in the plastic sleeve into an axial passage opening of the plastic sleeve and engages in a positive-locking manner into a groove or a recess of the inner tube or of a guide insert connected to the inner tube for the axial fixing of the two tubes, wherein it is a folding pole with at least three, or at least four tube portions, wherein the tube portions in the assembled state of the folding pole are connected to one another via plug connections oriented along the pole axis, and at least two tube portions in the folded together state are only connected to one another via a movable connection element, and wherein a pole handle is arranged on an uppermost tube portion and a pole tip is arranged on a lowermost tube portion, wherein one of the plug connections is realized via the clamping mechanism, wherein the clamping mechanism is fastened to a first tube portion, and in the case of which a second tube portion, which has a smaller or approximately identical outer diameter than/as the inner diameter of the first tube portion and which is displaceably mounted in the first tube portion itself, can be fixed in the relative axial position by the external clamping mechanism, and wherein the further plug connections are formed as pure plug connections, in the case of which tube portions in the pushed together state are only fixed in one axial direction, wherein the tube portions are connected to one another via at least one load cable, which is fastened to the lowermost tube portion and is fastened to the uppermost tube portion and is arranged running through the inner space of the at least two central tube portions, and wherein the folding pole is formed in such a manner that it can be transferred from the folded together state into the assembled state in that the further plug connections are plugged together and in that subsequently in the case of a detached clamping mechanism the second tube portion can be pulled out of the first tube portion so far until the load cable is under tension and wherein the external clamping mechanism is fixed in a self-latching manner.

25. A walking pole, trekking pole, Nordic walking pole, cross-country skiing pole or ski pole according to claim 24, wherein the pole has at least one outer tube with a clamping device fastened thereon and at least one inner tube as well as additionally a handle fastened to the outer tube and a pole tip on the inner tube or on a further tube portion connected directly or indirectly thereto with the same diameter as or a smaller diameter than the inner tube.

26. The pole as claimed in claim 24, wherein this involves a folding pole with at least three, or at least four tube portions, wherein the tube portions in the assembled state of the folding pole are connected to one another via plug connections oriented along the pole axis, and at least two tube portions in the folded together state are only connected to one another via a movable connection element, and wherein a pole handle is arranged on an uppermost tube portion and a pole tip is arranged on a lowermost tube portion,     wherein one of the plug connections is realized via the clamping mechanism, wherein the clamping mechanism is fastened to a first tube portion, and in the case of which a second tube portion, which has a smaller or approximately identical outer diameter than/as the inner diameter of the first tube portion and which is displaceably mounted in the first tube portion itself, can be fixed in the relative axial position by the external clamping mechanism,     and wherein the further plug connections are formed as pure plug connections, in the case of which tube portions in the pushed together state are only fixed in one axial direction,     wherein the tube portions are connected to one another via at least one load cable, which is fastened to the lowermost tube portion and is fastened to the uppermost tube portion and is arranged running through the inner space of the at least two central tube portions,     and that the folding pole is formed in such a manner that it can be transferred from the folded together state into the assembled state in that the further plug connections are plugged together and in that subsequently in the case of a detached clamping mechanism the second tube portion can be pulled out of the first tube portion so far until the load cable is under tension and in that the external clamping mechanism is fixed in a self-latching manner.

27. A clamping device for a walking pole, trekking pole, Nordic walking pole, cross-country skiing pole or ski pole for positive-locking, detachable axial fixing of an inner tube portion which can be pushed into an opening of the clamping device fastened to an outer tube,     wherein the clamping device has a circumferential plastic sleeve on which a clamping lever is articulated tiltably against the restoring force of a spring element on the outside via an axis that is arranged perpendicular to a pole axis,     wherein the plastic sleeve has two projections with through-openings and/or recesses for the axis, and the clamping lever is mounted between these projections tiltably about the axis, and wherein the plastic sleeve has a radial passage opening,     wherein the clamping lever has a first lever arm with a pressure region, which is accessible from the outside, for releasing the clamping device and a second lever arm which is arranged on the other side of the axis, wherein the second lever arm has a clamping projection arranged substantially radially with respect to the pole axis, which clamping projection engages through the radial passage opening in the plastic sleeve into an axial passage opening of the plastic sleeve and engages in a positive-locking manner into a groove or a recess of the inner tube or of a guide insert connected to the inner tube for the axial fixing of the two tubes, and     wherein the clamping lever has, as seen in the direction of the axis, a substantially L-shaped profile, the lower horizontal limb of which forms with its exposed end the clamping projection, and the upper vertical limb of which provides the pressure region, wherein reversed regions on the two edge regions facing the projections toward the tube are provided, which regions have in each case a passage opening for the axis and which run substantially parallel to the main running direction of the projections.

\* \* \* \* \*